United States Patent [19]
Ito

[11] Patent Number: 5,649,798
[45] Date of Patent: Jul. 22, 1997

[54] INSERT FOR DECK PLATE

[76] Inventor: Katsuo Ito, Minamiku Makomanai, Kashiwaoka 2-7-15, Sapporo, Japan

[21] Appl. No.: 334,921

[22] Filed: Nov. 7, 1994

[30] Foreign Application Priority Data

Dec. 13, 1993 [JP] Japan .................... 5-342365

[51] Int. Cl.$^6$ .................... F16B 25/00; F16B 33/00
[52] U.S. Cl. .................... 411/369; 411/387; 411/533; 411/542; 52/704
[58] Field of Search .................... 411/368, 369, 411/386, 387, 150, 544, 533, 542; 52/699, 700, 704, 707

[56] References Cited

U.S. PATENT DOCUMENTS

| 4,720,223 | 1/1988 | Neights et al. .................... 411/544 X |
| 4,883,396 | 11/1989 | Shamah et al. .................... 441/387 X |
| 5,205,690 | 4/1993 | Roth .................... 52/704 X |
| 5,428,936 | 7/1995 | Roth .................... 52/704 |

FOREIGN PATENT DOCUMENTS 2611395  7/1977  Germany .................... 411/387

*Primary Examiner*—Neill R. Wilson

[57] ABSTRACT

A screw insert for deck plates which is configured to both drill the pilot hole and thereafter be screwed into the deck plates in a simple step. The insert also has means to fill the gap between the pilot hole and the insert structure to be completely filled.

4 Claims, 5 Drawing Sheets

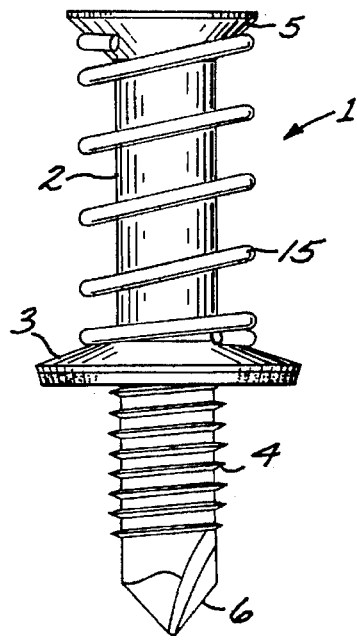
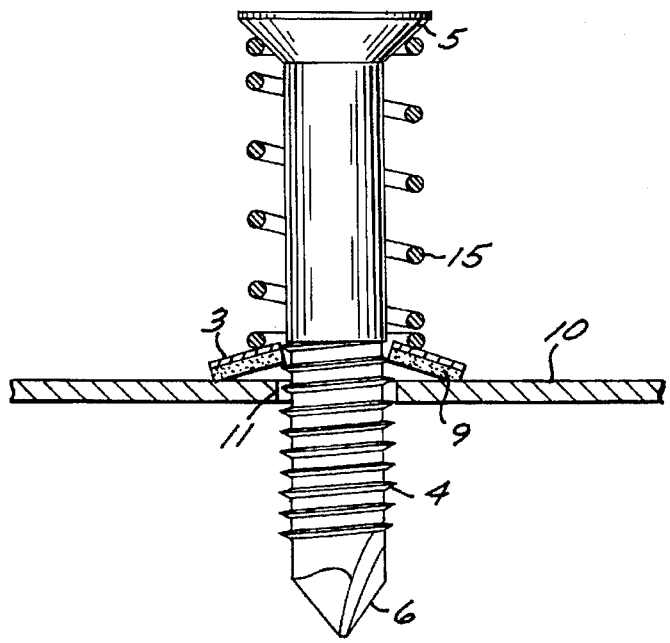
FIG. 11    FIG. 12
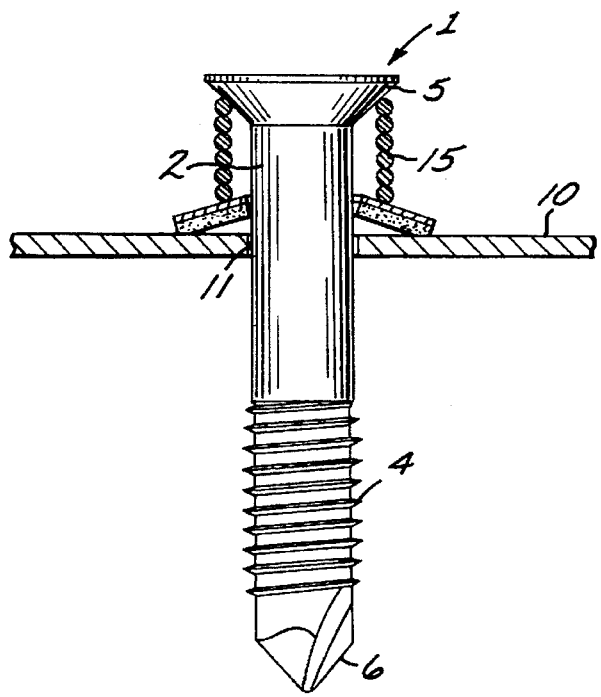
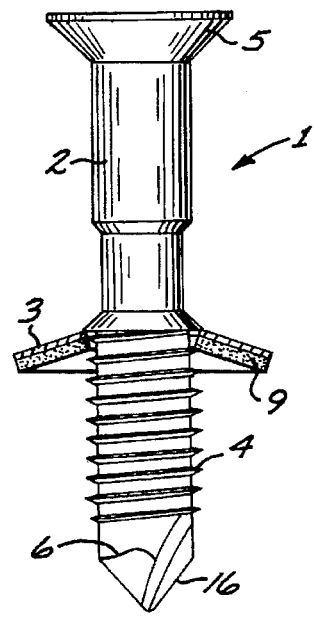
FIG. 13    FIG. 14

INSERT FOR DECK PLATE

BACKGROUND OF THE INVENTION

1. Field of the Invention

The present invention relates to improvements in deck plate inserts.

2. Description of the Prior Art

In order to fasten an insert to the deck plate, the prior art required the insert to be hammered or screwed into a pilot hole after the hole was drilled into the deck plate by an installation tool, such as a power drill.

Thus, the work of drilling the pilot hole into the deck plate and installing the insert had to be done separately making the overall installation process inefficient. In addition, a problem was created when concrete was poured into the deck plate as its water content flowed out of the gap between the pilot hole of the deck plate and installed insert, causing water damage to the underlying structure.

What is therefore desired is to provide an insert, particularly adapted for use with deck plates, that improves the efficiency of the insert installation process and eliminates the aforementioned water flow problem.

SUMMARY OF THE PRESENT INVENTION

The present invention provides a screw insert particularly adapted for use in deck plate which has a configuration that enables the insert to first drill the pilot hole and, as the installation process continues, to be screwed into the deck plate all in a single step. The insert also includes means to fill the gap between the pilot hole and the insert structure to be filled to prevent the water content of the overlying concrete layer from flowing therefrom.

Specifically, the insert has a male screw section formed on one end of the bolt and a drill section formed at the tip of the male screw section of the insert, an anchor head formed on the other end of the bolt, and a washer fitted into the aforementioned bolt adjoining the basal end of the aforementioned male screw section.

The washer is fitted squarely against the ring-like stopper formed as a lip on the aforementioned bolt. In a second embodiment, the washer is firmly set at the basal end of the male screw section by a spring fitted around the bolt.

When the insert is made to revolve by connecting the anchor head to the power tool a pilot hole is drilled by the drill section at the tip of the insert, the screw thread of the male screw section subsequently twisting into the aforementioned pilot hole and the insert then being screwed into the deck plate. When the insert is screwed down to the basal end of the male screw section, water is not lost through leakage when concrete is poured over the deck plate as the washer closes the pilot hole.

As the washer is pressed against the ring-like stopper projecting around the end of the bolt and is prevented from moving toward the anchor head, it closes the pilot hole of the deck plate securely.

As the washer is made to attach to the deck plate under pressure exerted by the spring toward the male screw section in the second embodiment, the insert moves downward toward the drill section against the force of the spring. Accordingly, when the insert is inserted into the deck plate, it becomes possible for the anchor head, still protruding from the deck plate, to be pushed in, and a worker would encounter no difficulty such as having the insert fall sideways when the worker steps on it inadvertently.

DESCRIPTION OF THE DRAWING

For a better understanding of the invention as well as other objects and further features thereof, reference is made to the following description which is to be read in conjunction with the accompanying drawing wherein:

FIGS. 11–13 illustrate a third embodiment of the insert of the present invention; and FIG. 14 illustrates a fourth embodiment of the present invention.

DESCRIPTION OF THE PRESENT INVENTION

Figure 1:
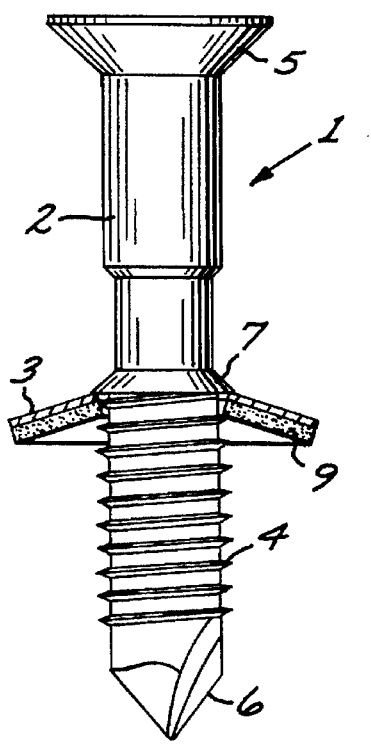
FIG. 1 is a front view of the insert of the present invention.
Figure 2:
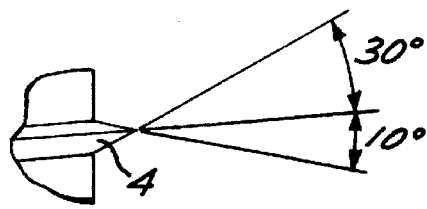
FIG. 2 is an enlargement of a part of the male screw thread of the insert shown in FIG. 1.
Figure 3:
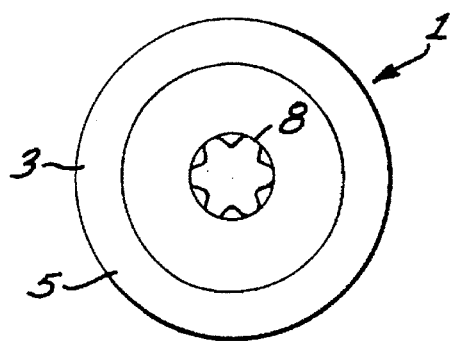
FIG. 3 is a top view of the insert shown in FIG. 1.

As shown in FIG. 1, the insert 1 of the present invention comprises shank portion 2 and ring-like washer 3. The shank portion 2 has a male screw section 4 on one end of the steel bolt, as well as the anchor head section 5 on the other. A drill section 6 is formed at the tip of the male screw section 4. As shown in FIG. 2, while the angle of the screw thread of the male screw section 4 is 30° on the side of the drill section 6, it is more acute at 10° on the side of the anchor head 5. The ring-like stopper 7 is formed as a lip on the bolt near the basal, or base, end of the male screw section 4 of the shank portion 2. A coupling hole 8 for a power tool is cut into the end surface of the anchor head 5 at the top of the shank portion proper 2, as shown in FIG. 3.

Figure 4:
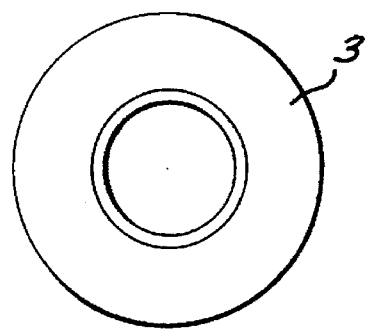
FIG. 4 is a top view showing the washer set into the insert of the present invention.
Figure 5:
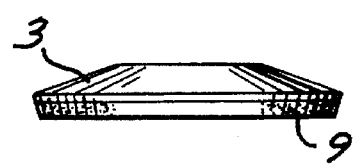
FIG. 5 is a front view of the washer.
Figure 6:
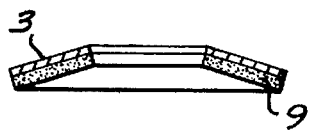
FIG. 6 is a cross-sectional view along line 6—6 of FIG. 5.

As shown in FIGS. 4–6, washer 3 has a ring-like sealer material 9 glued on the reverse side of a dish spring washer.

The washer 3, with sealer, is set into the bolt section of the shank portion 2 adjoining the base end of the male screw 4 and is prevented from moving toward the anchor head 5.

Figure 7:
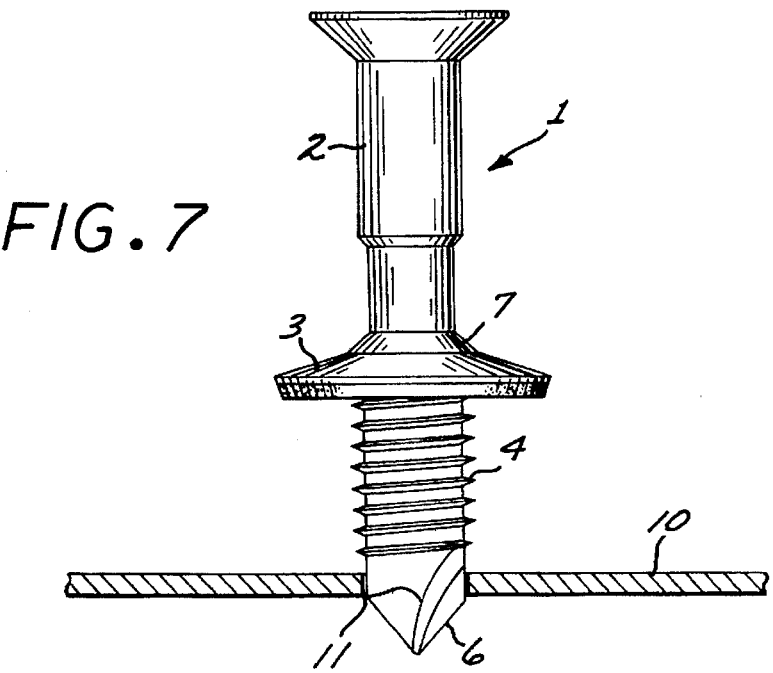
FIGS. 7–9 show the various stages of the installation of the insert into the deck plate.
Figure 8:
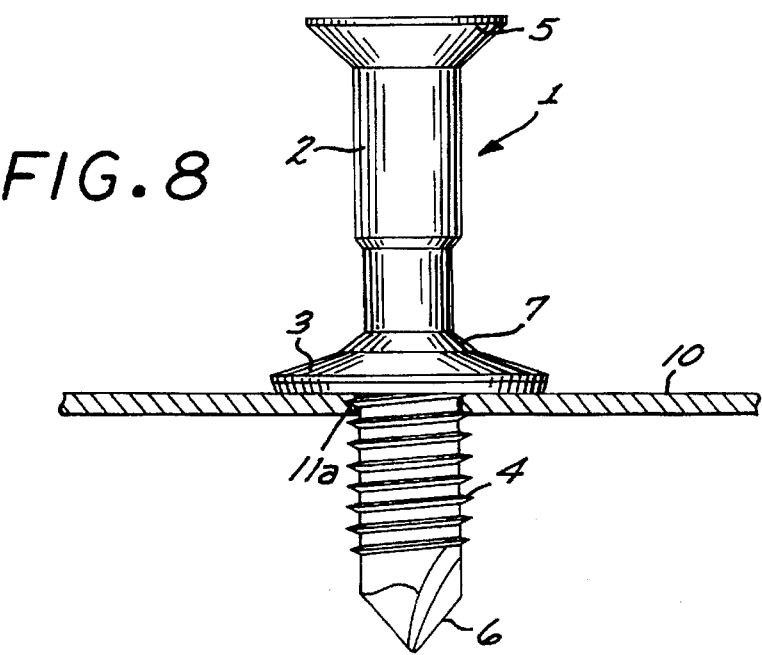

The insert 1 is installed to deck plate 10 by coupling a power tool (not shown) into the coupling hole 8 of the anchor head 5. As shown in FIG. 7, when the top of the drill section 6 is pressed against the deck plate 10 and the insert 1 is made to spin by the power tool, a pilot hole 11 is first drilled into the deck plate 10 by the drill section 6, and then the male screw 4 bites into the periphery of the pilot hole 11, as it forms a female screw 11a, and is screwed in until the washer 3 presses against the deck plate 10, as shown in FIG. 8. Consequently, the insert 1 can be fastened to the deck plate 10 in one step without drilling the pilot hole 11 beforehand. Also, as the angle of the screw thread of the male screw section 4 on the side of the anchor head 5 is quite acute, a high fastening power can be obtained even though the female screw 11a tapped into the deck plate 10 has one to two threads, thus making it unlikely that the insert will become loosened unexpectedly, and increasing the work efficiency as the screwing torque is lightened. Furthermore, if some V notches are cut into the male screw section 4 at proper intervals (not shown), the screwing torque will be additionally lightened and allow the work to be done more efficiently.

Figure 9:
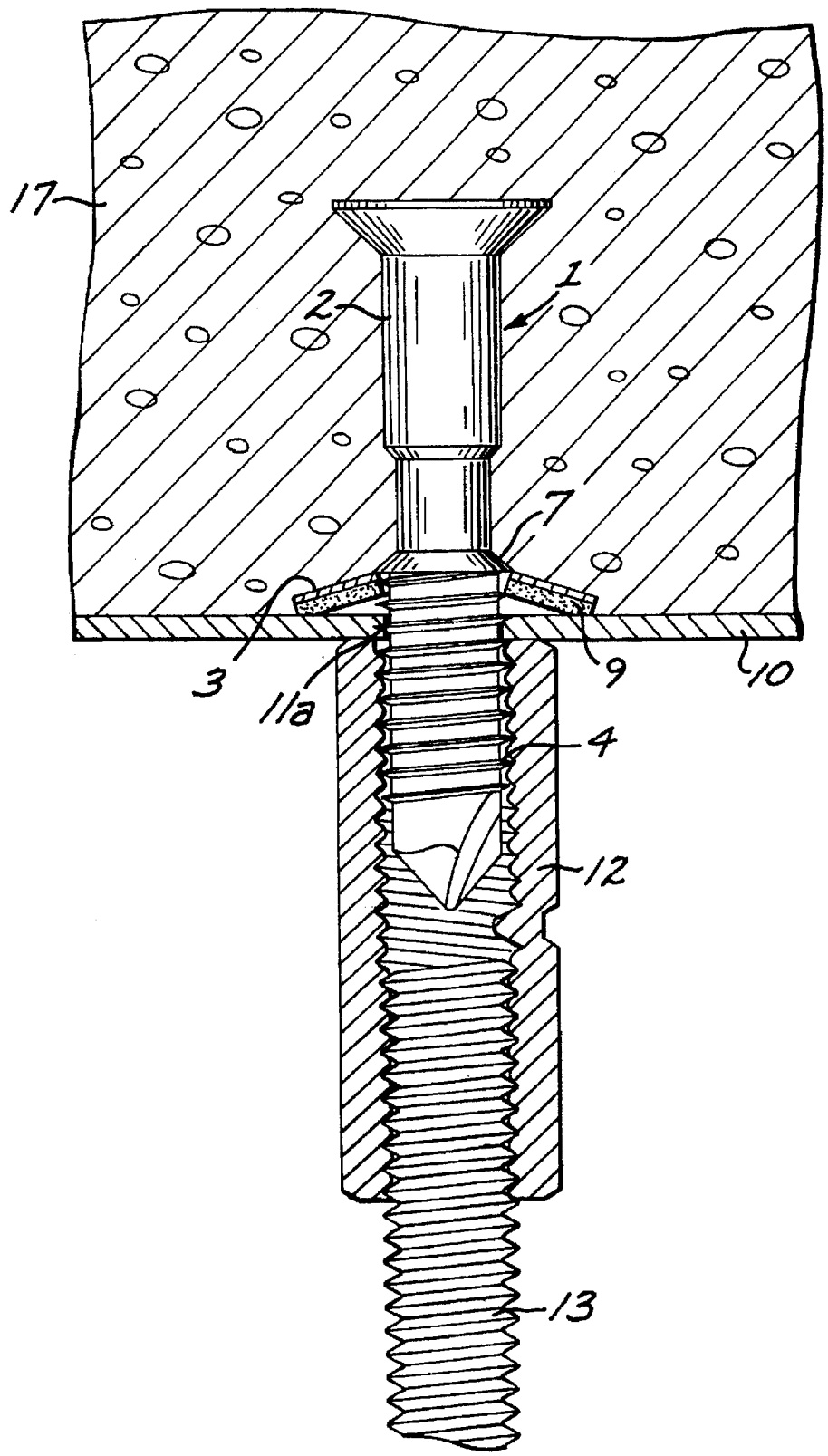

After the insert 1 is fastened to the deck plate 10 in this manner, concrete 17 is poured over the deck plate 10, as shown in FIG. 9. At this time, as the sealer material 9 of the washer 3 adheres tightly to the deck plate 10 and closes the pilot hole 11, thus preventing the water content from leaking out of the pilot hole 11 and damage the underlying structure. Since the insert 1 would be fixed in the concrete 17 when it cures, a long nut 12 can be screwed into the male screw section 4 that protrudes downward from the deck plate 10, and the long nut 12 can be used by having an attaching bolt 13 screwed into it for supporting the ceiling and the like. If heat insulation is required at the time of use, it is desirable to fabricate the long nut 12 from plastic.

Figure 10:
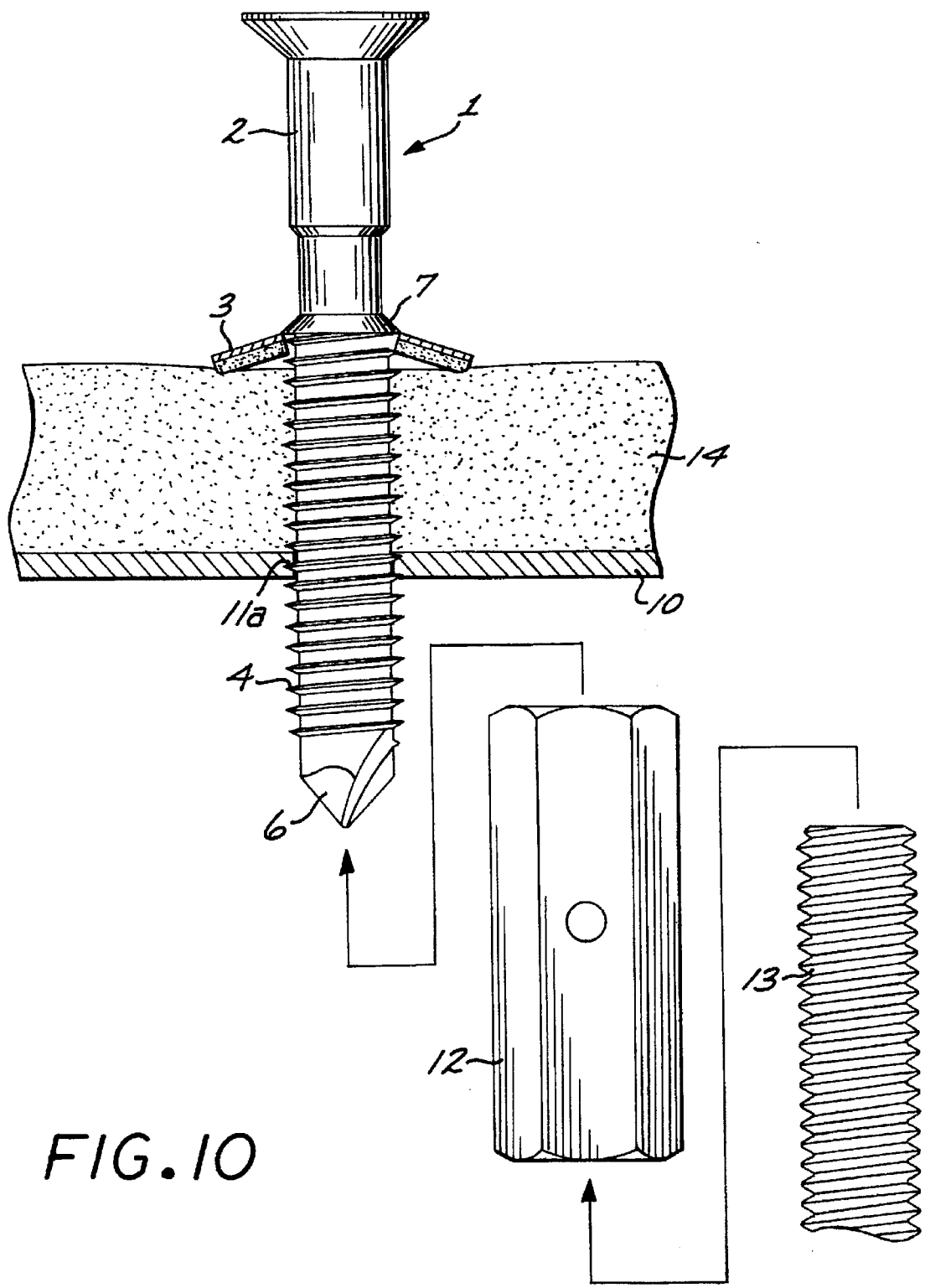
FIG. 10 is a vertical cross-sectional front view of a second embodiment of the invention.

FIG. 10 illustrates a second embodiment of the invention and shows the vertical cross-sectional front view of the insert as it is fastened to the deck plate 10. It should be noted that the constituent parts in this figure are identical with the same numbers as those used for the examples shown in FIG. 1 through 9, so no further explanation will be given.

Although the insert 1 as exemplified here is of nearly the same construction as the one shown in FIG. 1 through 9, the only difference is the length of the male screw section 4, which is especially long. Consequently, as shown in FIG. 10, even when a thick insulating material 14 is installed over the deck plate 10, the male screw section 4 can be made sure to protrude under the deck plate 10, and the long nut 12, can be screwed in tightly for installing the attaching bolt 13. Also, it can be used similarly when an insulating layer is formed by blowing the insulating material on the underside of the deck plate 10.

FIG. 11 through FIG. 13 illustrate a third embodiment of the present invention, FIG. 11 showing the front view of the insert, while FIG. 12 and FIG. 13 show the vertical cross-sectional front view of the insert as it is installed in the deck plate.

It should be noted that the constituent parts that have the same function as in the example shown in FIG. 1 through 9 are numbered similarly to avoid redundant explanation.

As shown in FIG. 11, the insert 1 of this example is made up of the arbor-like shank portion 2, the washer 3, with sealer, and the spring 15. Although the shank portion 2 is similarly constructed as the one exemplified in FIG. 1 through FIG. 9, it has no ring-like stopper installed on the bolt section. The spring 15, which is a compressed coil spring and fitted into the bolt section of the shank portion 2, is made to press against the washer 3, set into the shank portion 2, toward the male screw section 4, by being anchored at its top edge by the anchor head 5.

The insert 1 of the above construction is installed on the deck plate 10 in the same manner as for the example shown in FIG. 1 through 9. At this time, the washer 3, with sealer, is pressed by the spring 15 and closes the pilot hole 11 by making the sealer material 9 adhere tightly to the deck plate 10. Although the insert 1 installed in the deck plate 10 allows a part of the shank portion 2 and the anchor head 5 to protrude over the deck plate 10, troubles such as having the insert fall sideways when a worker steps on it inadvertently would not arise as the insert 1 of this example would sink in against the force of the spring 15 when the anchor head 5 is pushed in, as shown in FIG. 13.

FIG. 14 illustrates a fourth embodiment of the invention and shows the front view of the insert. The constituent parts similar to those of the example shown in FIG. 1 through 9 are numbered similarly to obviate redundant explanation.

Although the insert 1 of this example is of a nearly similar construction as the example shown in FIG. 1 through 9, it has a stepped drill with the center drill section 16 formed at the tip. As the center drill section 16 is pressed against the deck plate and revolves, the center drill section 16 first drills a center hole and then the main body of the drill section 6 drills the pilot hole 11, enabling the pilot hole 11 to be drilled accurately. Consequently, when the insert 1 of this example is used it is possible to position the hole easily and drill holes accurately without making a dent with a center punch or drilling a small positioning hole beforehand at the installation position on the deck plate 10, and work efficiency can be improved further.

It is obvious that a similar effect can be obtained when the center drill section 16 is incorporated into the drill section 6 of the insert 1 shown in the aforementioned FIG. 10 and FIG. 11 through 13.

The present invention thus enables the pilot hole formed in a deck plate to be drilled with the drill section at the tip of the insert proper and to screw in the male screw section uninterruptedly to fasten the insert to the deck plate in one step and improve work efficiency by a large margin. Also, as the gap between the installed insert and the pilot hole can be filled by the washer, the water content will not be lost through leakage when concrete is poured over the deck plate thus preventing damage to the underlying structure.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. An insert for a deck plate wherein the insert comprises a first shank portion, an anchor head being formed on one end of said first shank portion, a second shank portion, a first end of said second shank portion being coupled to the other end of said first shank portion, said second shank portion having threads formed thereon, a drill section being incorporated at the second end of said shank portion, and a covering member integral with and positioned on the insert adjacent said first end of said second shank portion, said covering member comprising a washer and sealer material formed on one side of said washer, whereby a pilot hole formed by said insert drill section is closed by said sealing material thus preventing water from passing through said pilot hole.

2. The insert of claim 1 wherein said first shank portion has an integral anchor head section.

3. The insert of claim 1 wherein said drill section comprises a stepped drill with a center drill section at the drill tip.

4. An insert for a deck plate wherein the insert comprises a first shank portion, an anchor head being formed on one end of said first shank portion, a second shank portion, a first end of said second shank portion being coupled to the other end of said first shank portion, said second shank portion having threads formed thereon, a drill section being incorporated at the second end of said shank portion, and a covering member fitted into the insert adjacent said first end of said second shank portion, a spring member being positioned about said first shank portion between said anchor head and said covering member, said spring member applying force to said covering member in a direction towards the threaded portion of said second shank portion.

* * * * *